US010854369B2

(12) United States Patent
Runge (10) Patent No.: US 10,854,369 B2
(45) Date of Patent: Dec. 1, 2020

(54) TRANSFORMER STATION, METHOD AND APPARATUS FOR A TRANSFORMER STATION

(71) Applicant: Jörn Runge, Marklohe (DE)

(72) Inventor: Jörn Runge, Marklohe (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 16/448,629

(22) Filed: Jun. 21, 2019

(65) Prior Publication Data

US 2019/0311834 A1 Oct. 10, 2019

Related U.S. Application Data

(63) Continuation of application No. PCT/EP2017/078733, filed on Nov. 9, 2017.

(30) Foreign Application Priority Data

Dec. 22, 2016 (DE) .................. 10 2016 125 375

(51) Int. Cl.
*H01F 27/08* (2006.01)
*H01F 27/02* (2006.01)
*H02B 1/56* (2006.01)
*H02B 5/00* (2006.01)

(52) U.S. Cl.
CPC ......... *H01F 27/085* (2013.01); *H01F 27/025* (2013.01); *H02B 1/56* (2013.01); *H02B 5/00* (2013.01)

(58) Field of Classification Search
CPC ...... H01F 27/085; H01F 27/025; H01F 27/08; H01F 27/20; H01F 27/2876
USPC ............................ 336/55, 57, 59, 60; 290/55
See application file for complete search history.

(56) References Cited

U.S. PATENT DOCUMENTS

| 7,443,273 | B2 * | 10/2008 | Findeisen | H01F 27/08 336/57 |
| 8,665,047 | B1 * | 3/2014 | Dively | H01F 27/025 336/130 |
| 2005/0167989 | A1 * | 8/2005 | Kruger-Gotzmann | H02K 7/1823 290/55 |
| 2009/0289461 | A1 * | 11/2009 | Larsen | F03D 7/02 290/55 |
| 2011/0080001 | A1 | 4/2011 | Gundtoft et al. | |

(Continued)

FOREIGN PATENT DOCUMENTS

| CN | 101006532 A | 7/2007 |
| CN | 101169103 A | 4/2008 |

(Continued)

*Primary Examiner* — Tszfung J Chan
(74) *Attorney, Agent, or Firm* — Reinhart Boerner Van Deuren P.C.

(57) ABSTRACT

A transformer station, in particular, an offshore transformer station including at least one transformer and at least one transformer cooling unit arranged on at least one side wall of the transformer station or a roof of the transformer station and configured to cool the at least one transformer. The transformer station also includes at least one air deflecting unit arranged on at least one roof edge of the transformer station and/or at least one air deflecting unit arranged on at least one side edge of the transformer station. The air deflecting unit is arranged such that an air movement is deflectable in the direction of the transformer cooling unit.

10 Claims, 5 Drawing Sheets

(56) References Cited

U.S. PATENT DOCUMENTS

2011/0221554 A1\* 9/2011 Schwaiger .............. F03D 80/60
336/60
2013/0158897 A1 6/2013 Jain
2014/0193254 A1 7/2014 Gopolan et al.
2016/0290315 A1\* 10/2016 Borle ...................... F03D 13/20

FOREIGN PATENT DOCUMENTS

| CN | 102032105 A | 4/2011 | | |
|----|----|----|----|----|
| CN | 105627782 A | 6/2016 | | |
| DE | 739 588 C | 9/1943 | | |
| EP | 0 551 554 A1 | 7/1993 | | |
| EP | 0551554 A1 \* | 7/1993 | ............. | B61C 17/00 |
| EP | 1 918 581 A2 | 5/2008 | | |
| EP | 2 762 720 A2 | 8/2014 | | |

\* cited by examiner

TRANSFORMER STATION, METHOD AND APPARATUS FOR A TRANSFORMER STATION

CROSS-REFERENCE TO RELATED PATENT APPLICATIONS

This patent application is a continuation of PCT/EP2017/078733, filed Nov. 9, 2017, which claims priority to German Application No. 10 2016 125 375.8, filed Dec. 22, 2016, the entire teachings and disclosure of which are incorporated herein by reference thereto.

FIELD

The invention relates to a transformer station, in particular, an offshore transformer station, comprising at least one transformer and at least one transformer cooling unit arranged on at least one side wall or roof of the transformer station and configured to cool the at least one transformer. In addition, the invention relates to a method and an apparatus for a transformer station.

BACKGROUND

Nowadays wind energy systems are increasingly used for the production of electrical energy. So called offshore wind energy systems are preferred. The reason for this is that compared to onshore wind energy systems, the expected average wind speed and thus the expected energy output is generally higher due to the offshore location of such a wind energy system.

An offshore wind energy system or an offshore wind power plant usually comprises at least one offshore transformer station (also known as an offshore substation) and a plurality of wind turbines that are electrically connected to the offshore transformer station. The electrical power and current, respectively, generated by the wind turbines is first transmitted via cables to the offshore transformer station. The offshore transformer station is configured to transmit this current via at least one cable to an onshore head-end station in order to feed the current into a connected (public) power grid.

An offshore transformer station comprises at least one transformer to transform the current/voltage received from the wind turbine(s) for transmission to an onshore head-end station. Such a transformer is configured to process high currents in the range of 1000 A. To cool the transformer, a transformer cooling unit is often provided on at least one side wall or the roof of the offshore transformer station. Transformer and transformer cooling unit can form a unit.

Since a repair on the sea is associated with considerable effort, it is a steady concern to provide the highest possible operational safety. At present, transformers and the corresponding cooling units are dimensioned relatively large. The reason for this is that the relevant design standard does not (sufficiently) take cooling by wind into account. This leads to over dimensioning, unnecessary space requirements on the transformer station and thus unnecessarily high costs for the steel structure of the transformer station and its foundation, its installation and the acquisition costs of the transformers.

Therefore, the object of the invention is to provide a transformer station, a method for operating at least one transformer of a transformer station and an apparatus for a transformer station which enables a reduction of the required space and the costs without reducing operational safety.

BRIEF SUMMARY

The object is solved according to a first aspect of the invention by a transformer station according to the present disclosure, the object is solved according to an aspect of the invention by a method according to the present disclosure and according to a further aspect of the invention by an apparatus according to the present disclosure.

The transformer station, in particular, an offshore transformer station, comprises at least one transformer. The transformer station comprises at least one transformer cooling unit arranged on at least one side wall of the transformer station or on a roof of the transformer station and configured to cool at least one transformer. The transformer station comprises at least one air deflecting unit arranged on at least one roof edge of the transformer station and/or at least one air deflecting unit arranged on at least one side edge of the transformer station. The air deflecting unit is arranged in such a way that an air movement is steerable in the direction of the transformer cooling unit.

Contrary to the prior art, it has been recognized that the cooling power of a transformer cooling unit is increased by using the expected winds and, in particular, their wind direction at the transformer station by steering (directing) the air movement for air cooling. Transformers and/or transformer cooling units can be dimensioned smaller. Space requirements and/or installation costs can be reduced. Nevertheless, operational safety can be guaranteed and even increased.

The transformer station is preferably an offshore transformer station of an offshore wind energy system or an offshore head-end station of a high voltage direct current (HVDC) transmission system. An offshore wind energy system can comprise a plurality of wind turbines that are electrically connected to the transformer station via submarine cables. A wind turbine converts the kinetic energy of the wind by means of a rotor and a generator into electrical energy, which is transmitted to the transformer station via the submarine cables. The transformer station can be electrically connected to an onshore station such as a high voltage direct current (HVDC) transmission station. An electrical connection can, in particular, be realized by at least one submarine cable. At least one electrical parameter can be detected at the high voltage or low voltage side winding of the transformer to control the power or current fed into the electrical grid.

The transformer station may comprise one or more transformers. The at least one transformer can be coupled with a transformer cooling unit. For example, a fluid circuit (e.g. an oil circuit) can be provided in order to cool the at least one transformer.

A transformer station comprises at least one roof, one bottom and at least one side wall connecting the roof and the bottom. Usually, a transformer station comprises a rectangular base area. In this case, four side walls with four side edges may be provided. It goes without saying that according to other variants, other base shapes may also be provided.

A roof edge is, in particular, the area in which a vertical wall (e.g. side wall) meets or touches a horizontal wall (in particular the roof). In particular, a roof edge also includes a lower edge at the transformer station. A roof edge can have an angular or rounded shape. A roof edge is, in particular, a horizontal edge of the transformer station. A side edge is, in particular, the area where a first vertical wall (e.g. side wall) meets or touches another vertical wall (e.g. side wall). A side edge may have an angular or rounded shape. A side edge is, in particular, an essentially vertical edge of the transformer station.

At least one air deflecting unit is arranged on at least one roof edge or side edge, i.e. in the area where either one side edge meets a roof edge or one side edge meets a side edge. For example, at least one connecting element may be provided to fix the air deflecting unit in the area of a roof edge or a side edge. The at least one connecting element can be formed in such a way that there is a predeterminable minimum distance (e.g. at least 0.1 m, preferably between 1 m and 10 m) between the air deflecting unit and the respective edge.

The air deflecting unit, for example, in the form of a metal structure, is configured in such a way that an air flow (in particular wind) can be deflected in the direction of at least one transformer cooling unit. According to the application, it has been recognized that wind can be used for (additional) cooling, in particular, due to the high correlation between wind speed and electrical transformer current. It has also been recognized that, due to the lateral mounting of the transformer cooling unit, it can be in the slipstream under certain wind conditions. To enable cooling by the wind/air flow in this case as well, the air deflecting unit is arranged in the area of an edge in such a way that it can deflect an existing air movement/flow from at least one first direction in the direction of the at least one transformer cooling unit. In particular, an air duct can be formed by the air deflecting unit between the air deflecting unit (e.g. an air deflecting plate of the air deflecting unit) and the outer wall/roof of the transformer station, which air duct is formed in such a way that an air flow is deflected from at least one first direction in the direction of the at least one transformer cooling unit. The cooling of the transformer can be significantly improved, even if the cooling unit is temporarily in the slipstream of the transformer station.

According to a first embodiment of a transformer station of the present application, the air deflecting unit may comprise at least one air deflecting element, in particular, in the form of an air deflecting plate. An air deflecting element is, in particular, a flat element configured to deflect an air flow. The air deflecting element may be made of plastic, metal or a similar material. One or more air deflecting plate(s) are particularly suitable for air steering and wind steering, respectively. An air deflecting element, in particular, in the form of an air deflecting plate, can be fixed to a wall and/or a roof of the transformer station with one or more connecting elements in the area of an edge. An air duct can be created between at least one air deflecting (guiding) element, in particular, in the form of an air deflecting plate, and the outer wall or roof. Due to the corresponding arrangement of at least one air deflecting element, in particular, in the form of an air deflecting plate of an air deflecting unit, the air duct can direct an air flow from at least one first direction in the direction of the transformer cooling unit. It goes without saying that a plurality of connecting elements can be provided, e.g. to ensure sufficient stability and/or optimum redirection.

An air deflecting element, in particular, in the form of an air deflecting plate, can comprise any shape. In particular, it has a flat structure. Preferably, the air deflecting plate can have a plane (or flat) side profile or a curved side profile. It is also possible to combine a plurality of air deflecting plates to create a pre-defined side profile of an air deflecting unit. The air deflecting plate can, in particular, be adapted to the dimensions of the transformer station and/or to the dimensions and/or position of the transformer cooling unit. An even better cooling can be provided in a simple way.

In principle, according to a preferred embodiment, the at least one air deflecting unit can be a static unit. Such a unit can be easily designed, installed and operated. According to a further embodiment of a transformer station in accordance with the application, the air deflecting unit can be an air deflecting unit which can be (dynamically) adjusted to the current wind conditions. In other words, such an air deflecting units allows the provision of different air ducts, for example, depending on a current wind direction. In particular, at least two air ducts of different shapes can be created by moving an air deflecting plate.

Preferably, the air deflecting unit may comprise at least one actuator operatively connected to the at least one air deflecting element. The at least one actuator can be configured to move (operate) the at least one air deflecting element between at least one first position (specific angle and/or distance to the transformer station) and a further position (specific further angle and/or distance to the transformer station). The actuator can be configured to set intermediate positions between the first position and the further position. By allowing the actuator to change the air deflecting element, in particular, in respect to angle and/or distance to the transformer station, the air duct can be changed dynamically. The purpose, in particular, is to maximize the cooling effect of the wind flow. One control objective would be to minimize the transformer temperature by, for example, iteratively changing the angle and distance to the transformer station with an optimum value controller of angle and distance.

It goes without saying that a plurality of actuators can be provided. An actuator can be attached to a connecting element and/or a further air deflecting plate and/or the wall or roof of the transformer station. In the latter case, an actuator can at least partially take over the function of a connecting element at the same time.

In a particularly preferred embodiment of a transformer station, the transformer station may comprise at least one control unit configured to control the actuator. For example, the control unit can be integrated in the transformer station or connected to it via a communication channel. The control unit can be configured to control the actuator depending on at least one provided meteorological parameter. For example, a wired and/or wireless communication link may be provided between the control unit and the at least one actuator. In particular, the control unit may be configured to send a drive signal to the at least one actuator to cause a movement of at least one air deflecting plate from a first position to at least one further position (to cause a change in the shape of an air duct).

According to a further embodiment of the transformer station, the at least one meteorological parameter can be the (local) wind speed (at the transformer station or a further nearby measuring point) and/or the (local) wind direction (at the transformer station or a further nearby measuring point) and/or the (local) humidity (at the transformer station or a further nearby measuring point) and/or the (local) ambient temperature (at the transformer station or a further nearby measuring point) and/or the (local) solar radiation (at the transformer station, in particular, at the transformer cooling unit or a further nearby measuring point). In particular, the at least one meteorological parameter may be an instantaneously measured (or predicted) meteorological parameter. For example, the transformer station may comprise at least one measuring unit to measure at least one of said parameters, in particular, at the transformer station. The at least one measured parameter can be continuously detected and can be provided to the control unit, for example, via a communication link. It has been recognized that each of the above parameters can have an influence on the cooling of the transformer cooling unit. Advantageously at least said parameters can be measured and can be provided to the control unit. The control unit can evaluate the provided parameters and can cause optimum adjustment of the actuators (and the resulting air duct(s)).

In a further embodiment of a transformer station in accordance with the application, it is proposed that the transformer station may also comprise at least one measuring unit configured to measure at least one parameter relevant to the temperature of the transformer. The transformer station may also comprise at least one control device at least designed to control the current fed into the transformer at least as a function of the measured parameter. By providing a current control depending on a parameter that is relevant for the temperature of the transformer, the operational safety can be further increased and/or the current load of the transformer can be maximized. This allows the output power of an existing wind farm to be increased without damaging the transformer. In particular, this can enable "chip tuning" of existing wind turbine(s). Preferably, the current fed into at least one transformer can be controlled depending on at least one transformer temperature and/or wind direction.

For example, an evaluation unit comprising at least one comparator element can be provided. The comparator element can be configured to compare the measured parameter with at least one preset limit value. Depending on the comparison result, the current can then be controlled, for example, reduced. For example, a measured parameter can be compared with a permissible parameter range. At least if the parameter is outside the specified permissible range, the current fed into the transformer can be controlled until the measured parameter is within the permissible range again.

Preferably, at least one measured parameter can be the temperature of the transformer, such as the winding temperature of the transformer and/or the cooling fluid temperature in the transformer. If the measured temperature exceeds a specified maximum permissible temperature (limit value), the supplied current can preferably be reduced. Alternatively or additionally the at least one measured parameter can be a meteorological parameter comprising the (local) wind speed and/or the (local) wind direction and/or the (local) humidity and/or the (local) ambient temperature and/or the (local) solar radiation and can be evaluated, for example, by an evaluation unit. Limit value(s) may also be specified in this case.

As described above, a transformer station may comprise two or more transformers. For example, each transformer can be coupled with a corresponding transformer cooling unit. A current control can be implemented particularly preferably in order to control feeding of the current into the respective transformer depending on the respective instantaneous temperature of the at least two transformers. Thus, according to one embodiment, the transformer station can comprise at least one further transformer. The measuring unit can be configured to measure at least one parameter relevant to the temperature of the further transformer. For example, a measuring unit may comprise two or more measuring elements, such as temperature measuring instruments. The control device can at least be configured to control the current fed into the further transformer depending at least on the measured parameters of the at least two transformers. For example, an evaluation unit, which may be integrated in the control device, may detect that the temperature of at least one first transformer has exceeded the permissible (allowable) temperature, while the temperature of at least one further transformer is within a permissible range. The control device can then control the current flow (e.g. via switching operations in the connected network) in such a way that the current fed into at least one first transformer is reduced and the current fed into at least one further transformer is (correspondingly) increased. If the temperature conditions change again, a corresponding current control can be carried out again. It goes without saying that a control device can have two or more suitable controllers (e.g. I or PI controllers). The transformers can be operated optimally (maximum transformer currents) and used to full capacity. Furthermore, a common transformer dimensioning of all transformers of a transformer station can be carried out.

As has already been described, a further aspect of the invention is a method for controlling at least one transformer of at least one transformer station, comprising:
  measuring at least one parameter relevant to the temperature of the transformer, and
  controlling the current fed into the transformer at least depending on the measured parameter.

The transformer station can be a transformer station described above. For example, the temperature of the transformer and/or a meteorological parameter can be measured including wind speed and/or wind direction and/or humidity. It goes without saying that the transformer station can also be formed without an air deflecting unit. Preferably, the method may also comprise comparing the measured parameter with at least one specified limit value, as previously explained.

In addition, a further aspect of the invention is an apparatus for a transformer station with at least one transformer, in particular, a transformer station described above. The apparatus comprises at least one measuring unit configured to measure at least one parameter relevant to the temperature of the transformer. The apparatus comprises at least one control device at least configured to control the current fed into the transformer depending on the result of the comparison.

In particular, the apparatus can be operated according to the method described above and/or the units/devices described above. For example, at least one comparison element may be configured to compare the measured parameter with at least one specified limit value. It goes without saying that the transformer station can also be formed without an air deflecting unit.

The features of the transformer stations, methods and apparatuses can be freely combined with each other. In particular, features of the description and/or of the dependent claims, even with complete or partial circumvention of features of the independent claims, may be independently inventive in their own right or freely combined with each other.

There are now a plurality of possibilities for designing and further developing the transformer station according to the invention, the apparatus according to the invention and the method. In this regard, reference is made on the one hand to the claims subordinate to the independent patent claims, and on the other hand to the description of execution examples in connection with the drawing.

DETAILED DESCRIPTION

In the figures, the same reference signs are used for the same elements.

Figure 1:
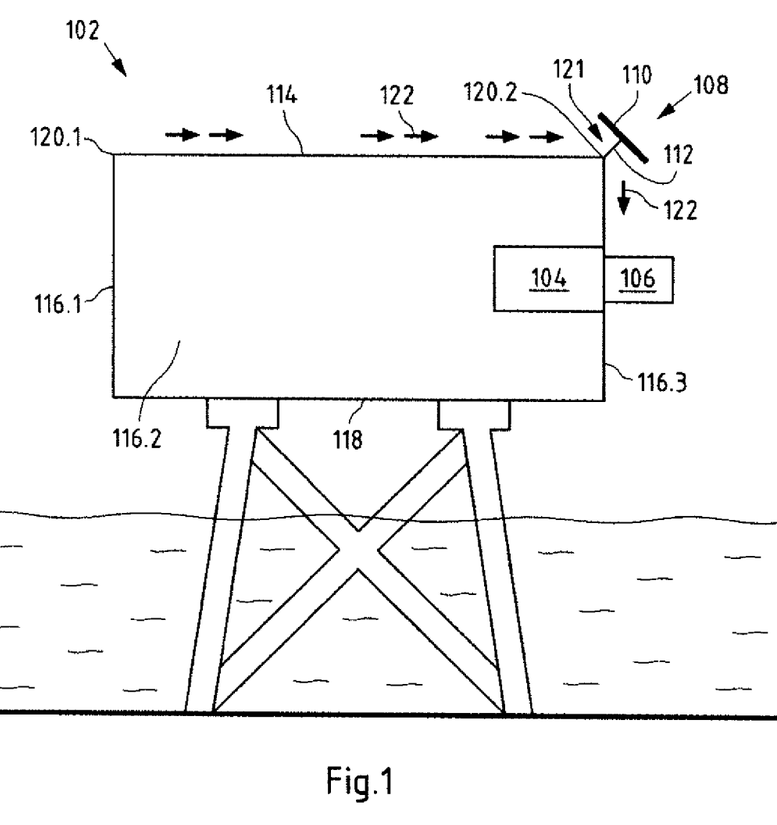
FIG. 1 shows a schematic side view of an a first embodiment of a transformer station in accordance with the present application.

FIG. 1 shows a schematic view of a first embodiment of a transformer station 102 according to the present application. The transformer station is an offshore transformer station 102 of an (not shown) offshore wind energy system and offshore wind energy park, respectively. The offshore wind energy system can preferably comprise a plurality of offshore wind turbines connected to the offshore transformer station 102 and offshore substation 102, respectively, via submarine cables. In particular, a submarine cable is configured to transmit the electrical energy generated by a wind turbine to the next wind turbine or to the offshore transformer station 102.

In particular, a plurality of wind turbines may be connected in series in several strings. For example, eight strings each with six wind turbines can be provided. An end of a string can be electrically connected to the offshore transformer station 102 via a submarine cable. Another end can be connected to another end of another string via an additional submarine cable. It is also possible to provide that a string can optionally be connected to several other strings. It shall be understood that according to other variants of the application, the wind turbines can also be arranged in ring structures.

For communication between the wind turbines and/or with the offshore transformer station 102, a communication network may be provided, which can be configured wireless and/or wired. In particular, two further submarine cables may be provided. In particular, the further submarine cables are configured to transmit the current generated by the offshore wind energy system from the offshore transformer station 102 to a head-end station, such as an HVDC head-end station. The HVDC head-end station may be located on land or sea to feed the generated current and power, respectively, into a public grid. The HVDC head-end station may have additional transformer units for this purpose. In particular, the HVDC head-end station may also be formed in accordance with a transformer station as specified in the application.

FIG. 1 shows, in particular, a schematic side view of an offshore transformer station 102. The offshore transformer station 102 has a roof 114, a bottom 118 and in this case side walls 116.1, 116.2 and 116.3. In particular, four side walls are provided. In addition, the offshore substation 102 comprises at least one transformer 104 coupled to a transformer cooling unit 106. In particular, a fluid cooling circuit may be provided to dissipate the heat generated by the high current processed by the transformer. As can be seen, the transformer cooling unit 106 is attached to a side wall 116.3.

The position of the transformer cooling unit 106 on a side wall 116.3 is generally mandatory. In particular, there is normally no space available on the roof 118 for such equipment (e.g. a helipad may be provided on the roof). A further point is the desired low center of gravity of the offshore transformer station 102. For practical reasons, this does not permit mounting of the arrangement comprising transformer 104 and transformer cooling unit 106 in the area of the roof 118.

In addition, the offshore transformer station 102 comprises at least one air deflecting unit 108. The air deflecting unit 108 comprises at least one flat air deflecting element 110, in this case an air deflecting plate 110, which is connected to the offshore transformer station 102 via at least one connecting element 112. For example, the ends of a connecting element 112 can be attached to the air deflecting plate 110 and the offshore transformer station 102, respectively, by screwing, welding or the like.

As can be seen from FIG. 1, the air deflecting unit 108 is arranged at a roof edge 120.2, i.e. in the area of the roof edge 120.2. In particular, the air deflecting unit 108 is arranged such that an air movement 122 is deflected in the direction of the transformer cooling unit 106. This means, in particular, that an air duct 121 is formed between the outer surface of the offshore transformer station 102 and the underside of at least one air deflecting plate (air baffle) 110 by means of the air deflecting unit 108. The air duct 121 is shaped such that an air movement 122 or wind flow 122 is (re)deflected in the direction of the transformer cooling unit 106.

In this embodiment, the transformer cooling unit 106 is always in the slipstream during the present wind conditions. In order to also achieve wind cooling under these conditions, the air deflecting unit 108 in accordance with the application is arranged, which causes a deflecting of the wind 122 or the air movement 122 in the direction of the transformer cooling unit 106 (see arrows). This enables wind cooling at any time regardless of the wind direction.

Figure 1A:
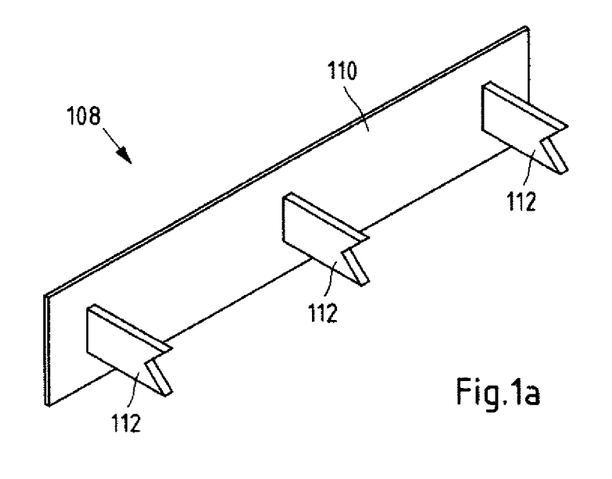
FIG. 1a shows a schematic perspective view of an embodiment of an air deflecting unit in accordance with the present application.

FIG. 1a shows a schematic perspective view of the embodiment of an air deflecting unit 108 arranged in FIG. 1. The air deflecting unit 108 can be a steel construction. Other materials are possible.

The present air deflecting unit 108 comprises a flat air deflecting plate 110 with side lengths a and b (where a>b is). The dimensions of the side lengths of an air deflecting plate 110 depend, in particular, on the dimensions of the transformer cooling unit 106 and/or the offshore transformer station 102. In addition, the air deflecting plate 110 has a plane or flat side profile. The at least one connecting element 112 preferably simultaneously serves as a spacer in order to achieve a desired minimum distance between the outer surface of the offshore transformer station 102 and the underside of the at least one air deflecting plate 110, so that, in particular, an air duct 121 with predetermined dimensions and/or shape can be formed. It goes without saying that—as the following embodiments will show—an air deflecting unit 108 can have other shapes and/or dimensions.

Figure 2:
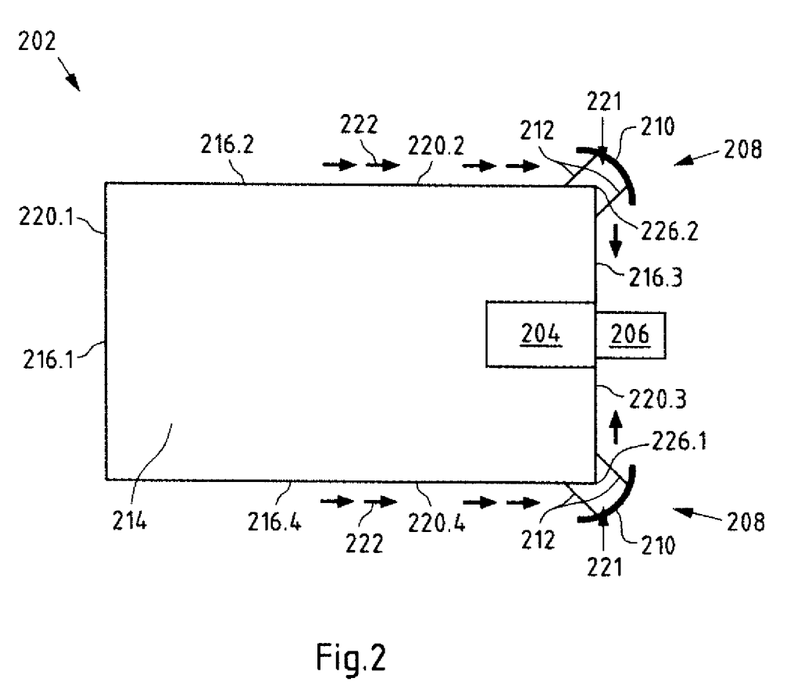
FIG. 2 shows a schematic top view of a further embodiment of a transformer station in accordance with the present application.

FIG. 2 shows a schematic top view of a further embodiment of an offshore transformer station 202 according to the present application. As can be seen, the offshore transformer station 202 shown has a rectangular cross-section with four side walls 216.1 to 216.4, resulting in four roof edges 220.1 to 220.4 (and four side edges).

The offshore transformer station 202 comprises two air deflecting units 208, a first air deflecting unit 208 is arranged in the area of a first side edge 226.1 and a further air deflecting unit 208 is arranged in the area of a further side edge 226.2. An air deflecting unit 208 is similarly formed to the air deflecting unit 108 shown in FIG. 1a. In contrast to this, the air deflecting unit 208 has a curved side profile. In addition, differently formed connecting elements 212 are provided.

Each air deflecting unit 208 is arranged at one side edge in such a way that an air movement 222 can be directed in the direction of at least one transformer cooling unit 206. As can be seen an air duct 221 is, in particular, formed. The air duct 221 is arranged in such a way that an air movement is directed from at least one first direction in the direction of the transformer cooling unit 206. The cooling power of the transformer cooling unit 206 can be significantly increased.

It shall be understood that in other variants of the application, an additional air deflecting unit may be arranged at an edge of the roof.

Figure 3:
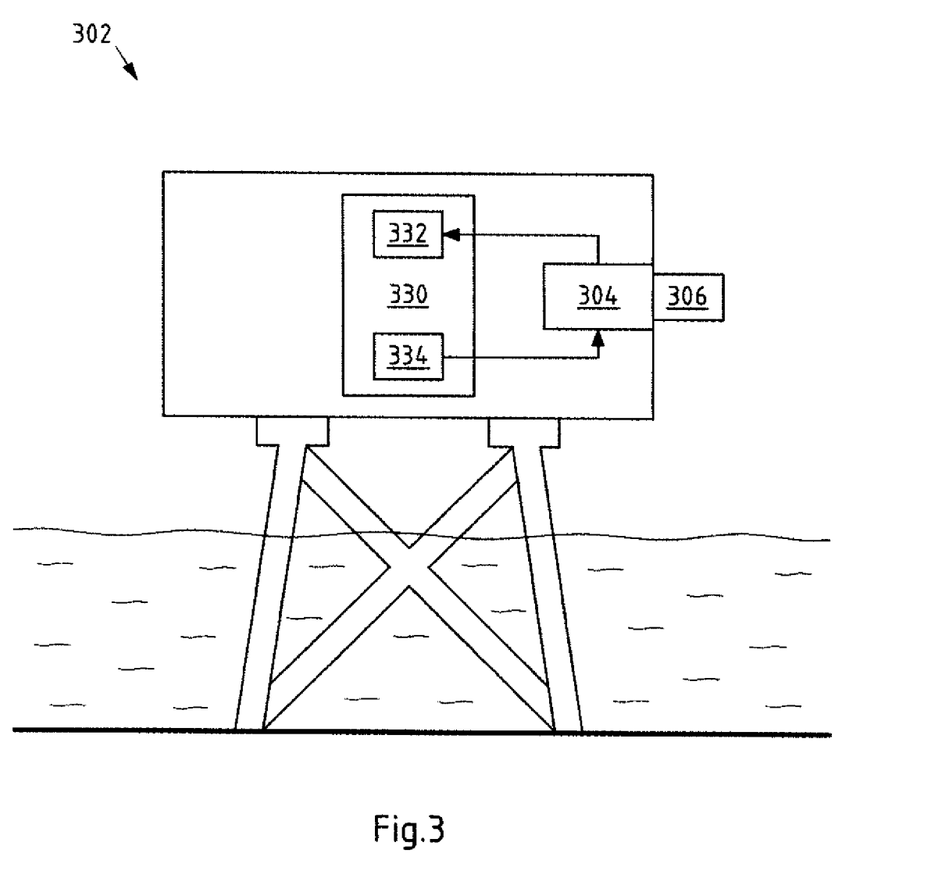
FIG. 3 shows a schematic side view of an embodiment of an apparatus in accordance with the present application for a transformer station.

FIG. 3 shows a schematic view of an embodiment of an apparatus 330 according to the present invention for a transformer station 302, in particular, an offshore transformer station 302. The offshore transformer station 302 comprises at least one transformer 304 coupled in the manner described above to a transformer cooling unit 306.

The apparatus 330 is formed, in particular, by hardware and/or software modules. The shown apparatus 330 comprises a measuring unit 332 for measuring at least one parameter relevant to the temperature of the transformer 304 and a control device 334 for controlling the current fed into the transformer 304 at least in dependence on the measured parameter. The measuring unit 332 is configured to measure the temperature of the transformer 304, preferably continuously and, in particular, in real time. In particular, the fluid temperature of the cooling fluid (e.g. oil) in the transformer 304 can be measured at one or more positions.

The control device 334 is configured to control the current fed into the transformer 304 (generated by one or more wind turbine(s)) depending on the measured temperature. For example, the control device 334 may comprise an evaluation unit for evaluating the measured transformer temperature. A limit value can be specified in the form of a maximum permissible transformer temperature $T_{zul}$. If the measured temperature $T_{mess}$ reaches the limit value $T_{zul}$ ($T_{mess}$ greater than or equal to $T_{zul}$), the fed current can be reduced by the control device 334. If the measured temperature is again below the maximum permissible transformer temperature, the fed current can be increased accordingly by the control device 334.

Figure 4:
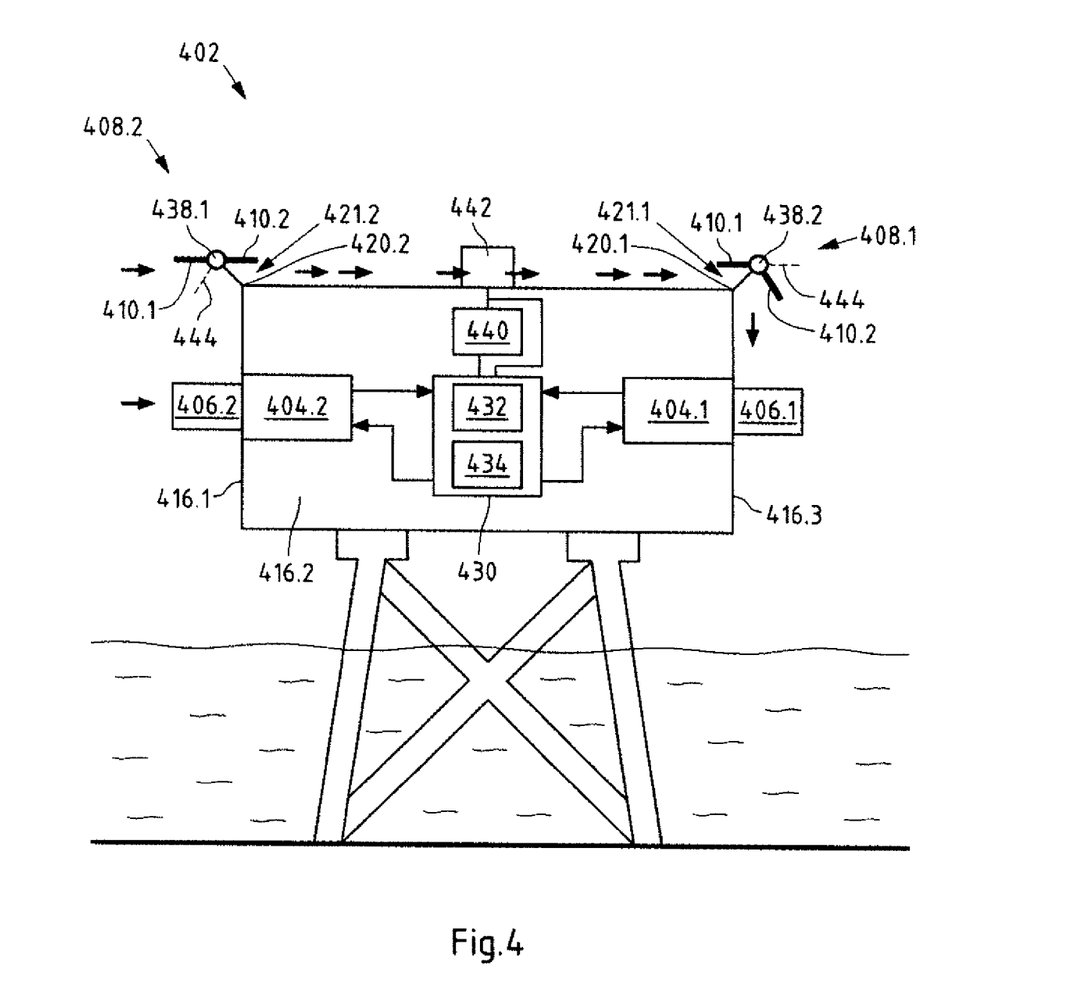
FIG. 4 shows a schematic side view of a further embodiment of a transformer station in accordance with the present application.

FIG. 4 shows a schematic side view of a further (particularly preferred) embodiment of a transformer station 402 of the present application. This transformer station 402, in particular, combines an apparatus 430 comprising a current controlling device 434 with at least one air deflecting unit 408.1, 408.2. In addition, this offshore transformer station 402 comprises at least two transformers 404.1, 404.2, each transformer 404.1, 404.2 being coupled to a corresponding transformer cooling unit 406.1, 406.2 as described above.

The apparatus 430 comprises a measuring unit 432 and a control device 434. Further, the apparatus 430 is coupled to meteorological measuring unit 442 located on the roof of the offshore transformer station 402. This measuring unit 442 is, in particular, configured to continuously and, preferably in real time, measure the weather condition(s) present at the offshore transformer station 402. For example, the measuring unit can measure at least one of the following parameters: Wind speed, wind direction, humidity, ambient temperature and solar radiation. At least one of these parameters may be provided to the control device 434.

The provided parameters can be evaluated by the control device 434. Depending on the evaluation, the current control of the at least two transformers 404.1, 404.2 can then take place. If, for example, a transformer temperature exceeds the permissible limit value, the current fed into this transformer 404.1 can be reduced and the current fed into the further transformer 404.2 can be increased (e.g. if there is a minimum temperature distance to the maximum permissible temperature). Alternatively or additionally at least one meteorological parameter can be considered. For example, if this parameter indicates that the instantaneous (and predicted) cooling power (capacity) is (will be) high, then the current can be controlled accordingly. If, on the other hand, a lower instantaneous (and predicted) cooling power can be assumed, the current fed into this transformer can be reduced (as a precaution). The operational safety can be increased and at the same time the efficiency of the transformers can be improved.

In addition, the present transformer station 402 comprises at least two air deflecting units 408.1, 408.2. A shown air deflecting unit 408.1, 408.2 is, in particular, a dynamically adjustable air deflecting unit 408.1, 408.2. A dynamically adjustable air deflecting unit 408.1, 408.2 according to the present application is characterized in that the formed air duct 421.1, 421.2, in particular, its shape, can be changed/adjusted.

Presently, an air deflecting unit 408.1, 408.2 comprises at least two air deflecting plates 410.1, 410.2 coupled to each other by an actuator 438.1, 438.2. The actuator 438.1, 438.2 can also be connected to a connecting element. An actuator 438.1, 438.2 is, in particular, configured to move and shift, respectively, an air deflecting plate 410.1, 410.2 between a first position and a further position (indicated by dashed lines 444). It goes without saying that the actuator 438.1, 438.2 can move an air deflecting plate into an intermediate position between the first position and the further (end) position.

As can be seen, by moving at least one air deflecting plate 410.1, 410.2, the shape of the air duct and thus the steering of an air movement 422 can be changed. Presently, in the exemplified case it is shown that the wind direction in the drawing plane runs from left to right. This means that the transformer cooling unit 406.2 is cooled directly by the air movement 422, while the further transformer cooling unit 406.1 is in the slipstream. By setting the two air deflecting plates 421.1, 421.2, the air movement 422 or the air flow 422 can be steered in the direction of the further transformer cooling unit 406.1.

In order to control the actuators depending on current and local weather conditions in such a way that optimum cooling of the at least two transformer cooling units 406.1, 406.2 arranged on the side walls 416.1, 416.3 is achieved, a control unit 440 is presently provided. For example, the further measuring unit 442 can provide the control device with at least one of the aforementioned parameters. In addition, it may be provided that further meteorological weather data (e.g. forecasts) can be provided by a further data source (e.g. a weather data provider). Depending on the at least one parameter (e.g. instantaneous wind direction) the control unit 440 can control at least one actuator 438.1, 438.2 in order to cause movement of at least one air deflecting plate 410.1, 410.2. For example, a wireless communication link may be provided between the actuators 438.1, 438.2 and the control unit 440.

In the case of an advantageous embodiment, it may be additionally or alternatively provided that the measuring unit 432 provides the measured transformer temperature(s) to the control unit 440. In this case, the control unit 440 may at least also be configured to control the at least one actuator 438.1, 438.2 at least depending on the transformer temperature(s) in order to cause, for example, a change in the shape of an air duct 421.1, 421.2. For example, depending on the instantaneous transformer temperatures, actuators 438.1, 438.2 can be controlled in such a way that a transformer 404.1, 404.2, whose temperature is at least in the range of the maximum permissible temperature, experiences better air cooling than a further transformer 404.1, 404.2.

It goes without saying that a transformer cooling unit and a transformer can form a functional unit.

Figure 5:
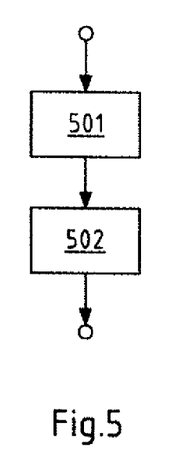
FIG. 5 shows a diagram of an embodiment of a method in accordance with the present application.

Finally, FIG. 5 shows a diagram of an embodiment of a method in accordance with the present application. The method can be used, in particular, to operate an apparatus 330, 430 described above.

In a first step 501, as already described above, at least one parameter relevant to the temperature of the transformer can be measured. In the next step 502, the current fed into the transformer can be controlled depending on the measured parameter. It goes without saying that steps 501 and 502 can at least partially be performed in parallel.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An offshore transformer station, comprising:
   at least one transformer,
   at least one transformer cooling unit arranged on at least one side wall of the transformer station or a roof of the transformer station and configured to cool the at least one transformer,
   at least one of at least one air deflecting unit arranged on at least one roof edge, in which a vertical wall meets a horizontal wall, of the transformer station or at least one air deflecting unit arranged on at least one side edge, in which a first vertical wall meets a further vertical wall, of the transformer station,
   wherein the air deflecting unit is arranged such that an air movement is steerable in the direction of the transformer cooling unit.

2. The transformer station according to claim 1, wherein the air deflecting unit comprises at least one flat air deflecting element,
   wherein the air deflecting element comprises, a planar side profile or a curved side profile.

3. The transformer station according to claim 2, wherein at least one connecting element is provided in order to fix the air deflecting unit in an area of the at least one roof edge or the at least one side edge, the at least one connecting element being formed in such a way that there is a minimum distance of at least 0.1 m between the air deflecting unit and the corresponding roof edge or side edge.

4. The transformer station according to claim 2, wherein the air deflecting unit comprises at least one actuator operatively connected to the air deflecting element,
   wherein the actuator is configured to move the air deflecting element between at least a first position and a further position.

5. The transformer station according to claim 4, wherein the transformer station comprises at least one control unit configured to control the actuator,
   wherein the control unit is configured to control the actuator depending on at least one provided meteorological parameter.

6. The transformer station according to claim 5, wherein the at least one meteorological parameter at least one of is a wind speed, a wind direction, an air humidity, an ambient temperature or a solar radiation.

7. The transformer station according to claim 1, wherein the transformer station further comprises:
   at least one measuring unit configured to measure at least one parameter relevant to a temperature of the transformer, and
   at least one control device at least configured to control a current fed into the transformer at least depending on the measured parameter.

8. The transformer station according to claim 7, wherein the at least one measured parameter is at least one of is the temperature of the transformer or a meteorological parameter comprising at least one of a wind speed, a wind direction, an air humidity, an ambient temperature or a solar radiation.

9. The transformer station according to claim 7, wherein the transformer station comprises at least one further transformer,
   wherein the measuring unit is configured to measure at least one parameter relevant to a temperature of the further transformer, and wherein the control device is configured at least to control a current fed into the further transformer at least depending on the measured parameters of the at least two transformers.

10. An apparatus for the transformer station with the at least one transformer, the transformer station according to claim 1, the apparatus comprising:
- at least one measuring unit configured to measure at least one parameter relevant to a temperature of the transformer, wherein the measured parameter is a meteorological parameter comprising at least of a wind speed or a wind direction, and
- at least one control device at least configured to control a current fed into the transformer depending on the measured parameter.

* * * * *

UNITED STATES PATENT AND TRADEMARK OFFICE
CERTIFICATE OF CORRECTION

PATENT NO.        : 10,854,369 B2                                   Page 1 of 1
APPLICATION NO.   : 16/448629
DATED             : December 1, 2020
INVENTOR(S)       : Jörn Runge It is certified that error appears in the above-identified patent and that said Letters Patent is hereby corrected as shown below:

On the Title Page

Under Abstract "10 Claims, 5 Drawing Sheets" should read --12 Claims, 5 Drawing Sheets--

In the Claims

Column 12, In Claim 2, Line 4, "comprises," should be --comprises--

Column 12, In Claim 6, Line 2, "parameter at least one of is" should be --parameter is at least one of--

Column 12, In Claim 8, Line 2, "at least one of is the" should be --at least one of the--

Column 13, In Claim 10, Line 7, "at least of" should be --at least one of--

Column 13, After Claim 10, Line 15, insert the following claims:
--11. A method for controlling at least one transformer of at least one transformer station, the method comprising:
  measuring at least one parameter relevant to the temperature of the transformer, wherein the measured parameter is a meteorological parameter comprising the wind speed and/or wind direction, and
  controlling the current fed into the transformer at least depending on the measured parameter.

12. The transformer station according to claim 3, wherein the minimum distance is between 1 m and 10 m.--

Signed and Sealed this
Fifth Day of January, 2021

Andrei Iancu
*Director of the United States Patent and Trademark Office*